(12) United States Patent
Hagiwara et al.

(10) Patent No.: US 11,383,905 B2
(45) Date of Patent: Jul. 12, 2022

(54) BINDING BAND

(71) Applicants: Yoshiteru Hagiwara, Kanagawa (JP); Hiroshi Nitta, Tokyo (JP); Tomoo Asami, Kanagawa (JP); Tetsuya Yano, Kanagawa (JP); Toshiharu Kawase, Kanagawa (JP); Kohhei Nagasawa, Saitama (JP)

(72) Inventors: Yoshiteru Hagiwara, Kanagawa (JP); Hiroshi Nitta, Tokyo (JP); Tomoo Asami, Kanagawa (JP); Tetsuya Yano, Kanagawa (JP); Toshiharu Kawase, Kanagawa (JP); Kohhei Nagasawa, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/843,177

(22) Filed: Apr. 8, 2020

(65) Prior Publication Data
US 2020/0331676 A1 Oct. 22, 2020

(30) Foreign Application Priority Data

Apr. 18, 2019 (JP) .............................. JP2019-079296

(51) Int. Cl.
*B65D 63/10* (2006.01)
*F16B 2/08* (2006.01)

(52) U.S. Cl.
CPC ............ *B65D 63/1063* (2013.01); *F16B 2/08* (2013.01); *B65D 2563/107* (2013.01)

(58) Field of Classification Search
CPC .. B65D 2563/107; B65D 63/1063; F16B 2/08
See application file for complete search history.

(56) References Cited

U.S. PATENT DOCUMENTS

| 5,088,158 | A | * | 2/1992 | Burkholder | ............. E05B 75/00 |
| | | | | | 128/879 |
| 5,402,971 | A | * | 4/1995 | Bower | .................... F16L 3/233 |
| | | | | | 24/16 PB |

(Continued)

FOREIGN PATENT DOCUMENTS

| JP | 9-159064 | 6/1997 |
| JP | 9-159066 | 6/1997 |

(Continued)

*Primary Examiner* — David M Upchurch
(74) *Attorney, Agent, or Firm* — Harness, Dickey & Pierce, P.L.C.

(57) ABSTRACT

A binding band includes a band portion, a through opening, a locking portion, a connecting portion, and an index portion. The band portion includes a plurality of locking teeth on one surface of the band portion. The band portion is to be inserted through the through opening. The through opening is disposed on one end of the band portion in a longitudinal direction of the band portion. The locking portion includes a tooth pawl configured to lock the locking teeth when the band portion is inserted through the through opening. The connecting portion protrudes from the locking portion in a direction intersecting the longitudinal direction of the band portion. The index portion is disposed on the connecting portion.

17 Claims, 9 Drawing Sheets

(56) References Cited

U.S. PATENT DOCUMENTS

| | | | | |
|---|---|---|---|---|
| 5,884,367 | A * | 3/1999 | Teagno | F16L 3/2334 |
| | | | | 24/16 PB |
| 6,102,347 | A * | 8/2000 | Benoit | F16L 3/233 |
| | | | | 24/16 PB |
| 6,119,314 | A * | 9/2000 | Freed | B65D 63/1063 |
| | | | | 24/16 PB |
| 6,326,890 | B1 * | 12/2001 | Costa | B65D 63/1072 |
| | | | | 340/568.1 |
| 7,062,820 | B1 * | 6/2006 | Oestreich | B65D 63/1027 |
| | | | | 24/16 PB |
| 7,360,744 | B2 * | 4/2008 | Kwilosz | F16L 3/137 |
| | | | | 248/68.1 |
| D714,632 | S * | 10/2014 | Pando | D8/396 |
| 9,210,969 | B2 * | 12/2015 | Wheelwright | A44B 11/2592 |
| D756,203 | S * | 5/2016 | Kelleghan | D8/356 |
| 9,643,764 | B1 * | 5/2017 | Huang | B65D 63/1072 |
| 9,682,807 | B1 * | 6/2017 | Lidey | F16L 37/02 |
| D812,754 | S * | 3/2018 | Blain | D24/155 |
| 2002/0104196 | A1 * | 8/2002 | Geiger | H02G 3/30 |
| | | | | 24/16 PB |
| 2011/0095089 | A1 * | 4/2011 | Kolton | G06K 19/041 |
| | | | | 235/492 |
| 2019/0061370 | A1 * | 2/2019 | Haase | B65D 63/10 |

FOREIGN PATENT DOCUMENTS

| | | |
|---|---|---|
| JP | 2004-071810 | 3/2004 |
| JP | 2005-229752 | 8/2005 |
| JP | 2007-041325 | 2/2007 |

* cited by examiner

LONGITUDINAL DIRECTION
OF WIRE BUNDLE

BINDING BAND

CROSS-REFERENCE TO RELATED APPLICATION

This patent application is based on and claims priority pursuant to 35 U.S.C. § 119(a) to Japanese Patent Application No. 2019-079296, filed on Apr. 18, 2019, in the Japan Patent Office, the entire disclosure of which is hereby incorporated by reference herein.

BACKGROUND

Technical Field

The present disclosure relates to a binding band.

Description of the Related Art

An image forming apparatus such as an electrophotographic copying machine, a printer, a facsimile, or an inkjet printer houses electronic components such as a control board and a printing mechanism in a housing, and electrically connects the electronic components with covered electric wires (hereinafter referred to as electric wires). In an image forming apparatus, since a large number of electric wires is used, wire bundles are inserted through ring-shaped harness clamps (hereinafter referred to as clamp) at appropriate positions in a housing to limit routing positions. Thus, interference of the electric wires with components in the housing is restrained. When bundling a plurality of electric wires into an electric wire bundle, a binding band having a band portion for fastening is suitably used.

SUMMARY

In an aspect of the present disclosure, a binding band includes a band portion, a through opening, a locking portion, a connecting portion, and an index portion. The band portion includes a plurality of locking teeth on one surface of the band portion. The through opening through which the band portion is to be inserted through the through opening. The through opening is disposed on one end of the band portion in a longitudinal direction of the band portion. The locking portion includes a tooth pawl configured to lock the locking teeth when the band portion is inserted through the through opening. The connecting portion protrudes from the locking portion in a direction intersecting the longitudinal direction of the band portion. The index portion is disposed on the connecting portion.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

Schematic Configuration of Binding Band

The present disclosure will be described in detail with reference to embodiments illustrated in the drawings. First, a schematic configuration of a binding band will be described. However, components, types, combinations, shapes, relative arrangements, and the like described in the embodiments are not intended to limit the scope of the present disclosure, but are merely illustrative examples, unless otherwise specified.

Figure 1A:
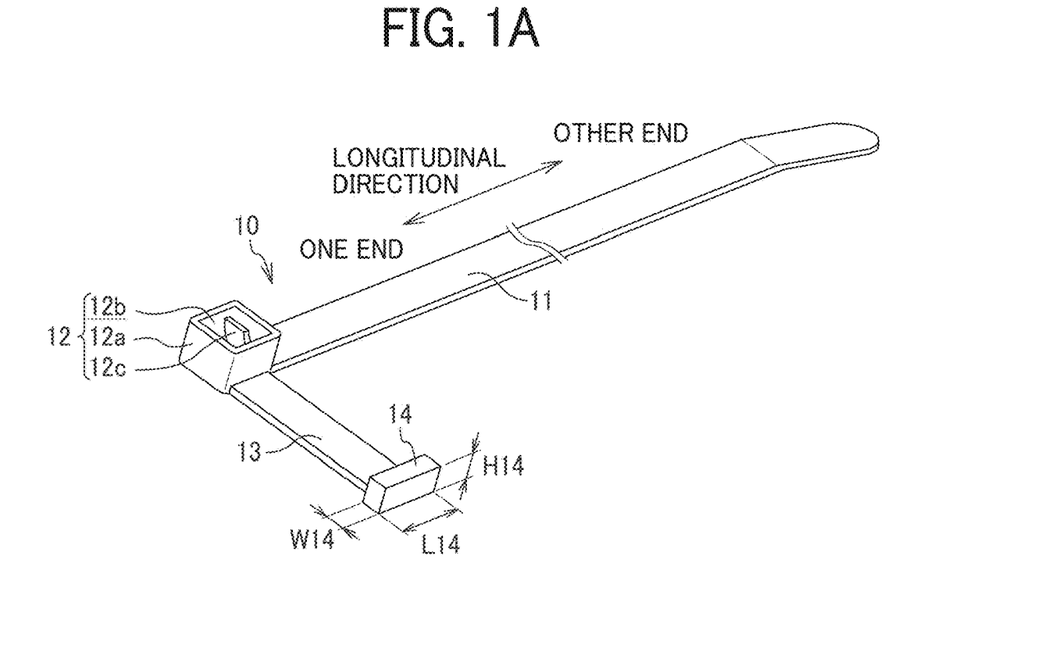
FIG. 1A is a perspective view of a binding band according to a first embodiment of the present disclosure.
Figure 1B:
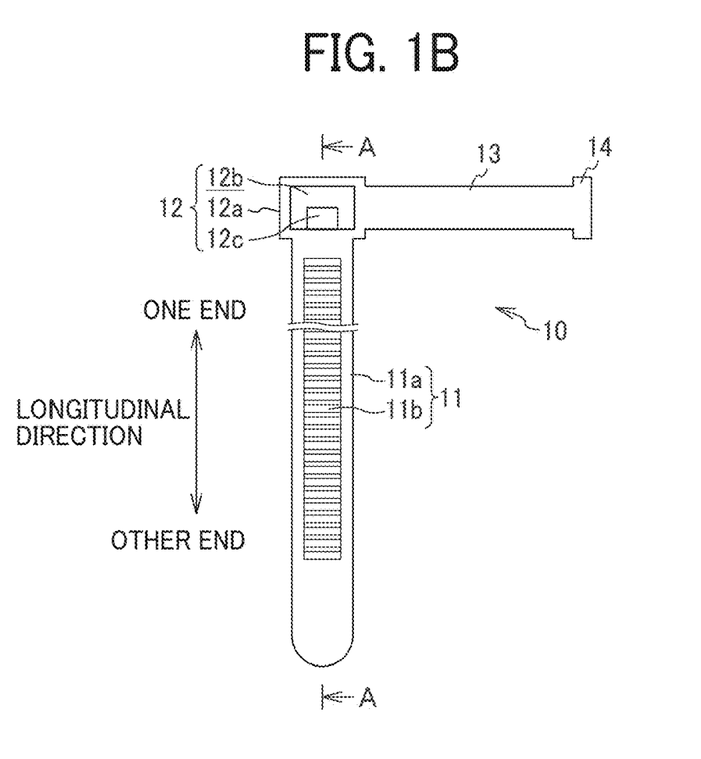
FIG. 1B is a rear view of the binding band.
Figure 1C:
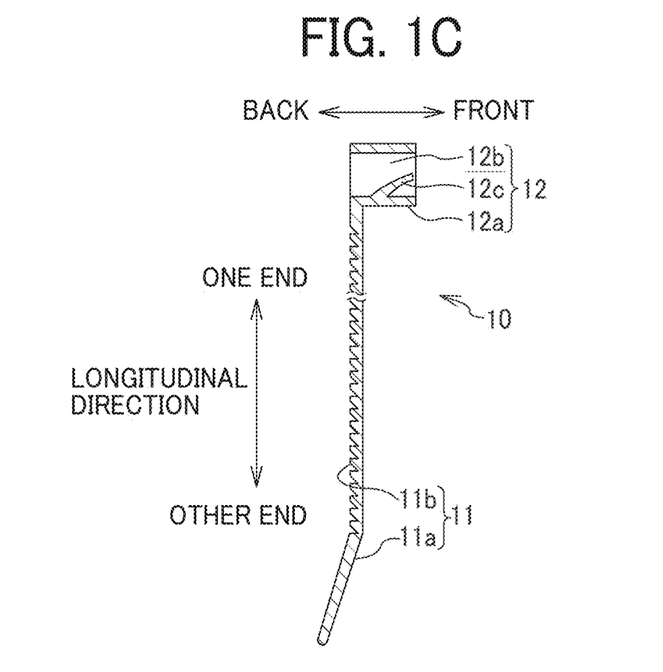
FIG. 1C is a sectional view of the binding band cut along a cross-section A-A in FIG. 1B.
Figure 1D:
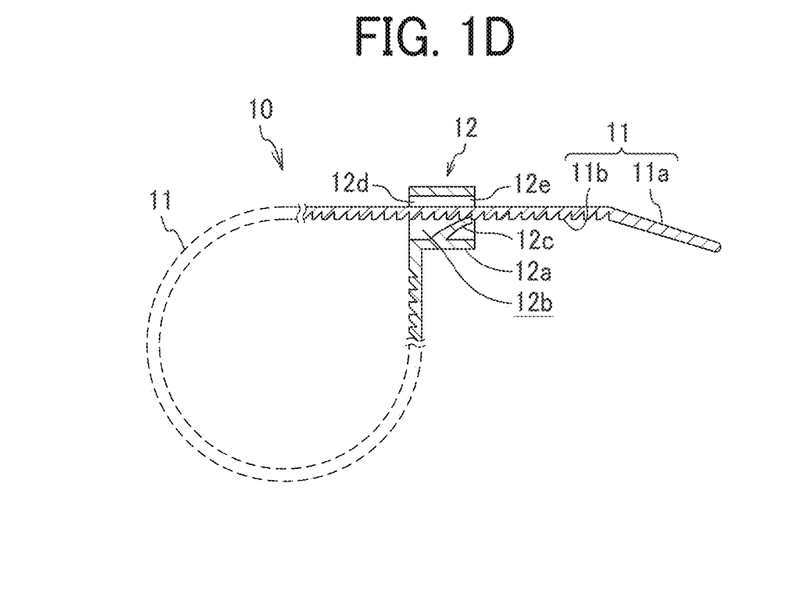
FIG. 1D is a partial enlarged sectional view illustrating a state of the binding band locked by a locking portion.
Figure 2:
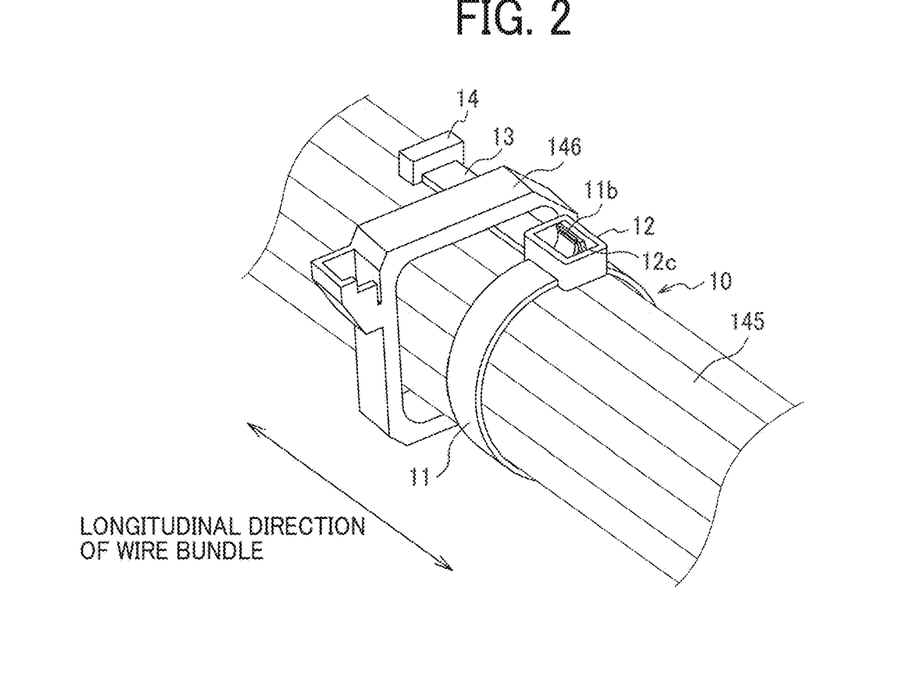
FIG. 2 is a perspective view of a wire bundle in a state in which the wire bundle is bound by the binding band according to the first embodiment and inserted through a clamp.

FIG. 1A is a perspective view of a binding band 10 according to a first embodiment of the present disclosure. FIG. 1B is a rear view of the binding band 10. FIG. 1C is a sectional view of the binding band cut along a cross section A-A in FIG. 1B. FIG. 1D is a partial enlarged sectional view illustrating a state of a band portion 11 of the binding band 10 locked by a locking portion 12. FIG. 2 is a perspective view of a wire bundle 145 in a state in which the wire bundle 145 is bound by the binding band 10 according to the first embodiment and inserted through a clamp 146.

As illustrated in FIGS. 1A to 1C, the binding band 10 according to the first embodiment includes a band-shaped band portion 11, a through opening 12b, a locking portion 12, a connecting portion 13 and an index portion 14. The band portion 11 has a plurality of locking teeth 11b formed on a back surface (one surface) of the band portion 11. The band portion 11 is inserted through the through opening 12b. The through opening 12b is disposed at an end of the band portion 11 in a longitudinal direction of the band portion 11. The locking portion 12 includes a tooth pawl 12c to lock the locking teeth 11b when the band portion 11 is inserted through the through opening 12b. The connecting portion 13 protrudes from the locking portion 12 in a direction intersecting the band portion 11. The index portion 14 is provided at a tip (an appropriate position) of the connecting portion 13.

As illustrated in FIG. 2, when the wire bundle 145 is bound by the binding band 10, the band portion 11 wrapped around an outer periphery of the wire bundle 145 is inserted through the through opening 12b of the locking portion 12. As a result, the locking teeth 11b of the band portion 11 are locked by the tooth pawl 12c, and the wire bundle 145 is arranged in a loop formed by the band portion 11. Pulling the other end of the band portion 11 reduces the diameter of the loop of the band portion 11 and the band portion 11 is brought into close contact with an outer circumferential surface of the wire bundle 145 to bind the wire bundle 145. Note that a surplus portion of the band portion 11 is cut off in FIG. 2.

When the wire bundle 145 is bound, the locking portion 12 and the index portion 14 are arranged with a space provided in a longitudinal direction of the wire bundle 145. The binding band 10 is bound at an appropriate position of the wire bundle 145 (a position suitable for the wire bundle 145 to be inserted through the clamp 146), and a portion between the locking portion 12 and the index portion 14 is inserted through the clamp 146. As a result, an appropriate portion of the wire bundle 145 is inserted through the clamp 146. Thus, excessive tension and loosening at a time of routing the wire bundle 145 are restrained.

As described above, inserting an appropriate position of an electric wire bundle through a clamp reduces excessive tension and loosening of the electric wire bundle. However, the electric wire bundle has no marking indicating the appropriate position, it may be difficult to insert the appropriate position of the electric wire bundle through the clamp. Hence, it is conceivable to indicate, with a binding band, a position (an appropriate position) of the electric wire bundle at which the electric wire bundle is inserted through the clamp. For example, a pair of binding bands may be attached at an interval in a longitudinal direction of the electric wire bundle to indicate a position between the binding bands as a position at which the electric wire bundle is inserted through the clamp. However, in this method, it is necessary to attach two binding bands to one clamp and it takes time to attach the binding bands.

As described above, the binding band 10 according to the present embodiment, allows the locking portion 12 and the index portion 14 to indicate a portion of the wire bundle 145 that is inserted through the clamp 146. Further, since the wire bundle 145 can be fastened by one band portion 11, the attachment of the band portion 11 to the wire bundle 145 can be easily performed.

Configuration of Image Forming Apparatus 100

Figure 3:
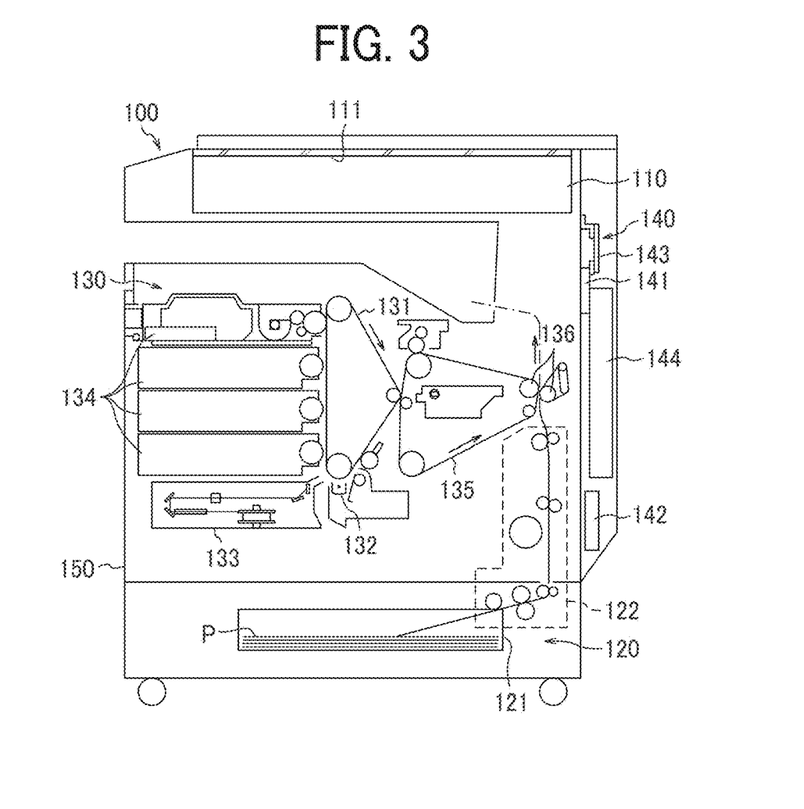
FIG. 3 is a schematic sectional view of an image forming apparatus.
Figure 4:
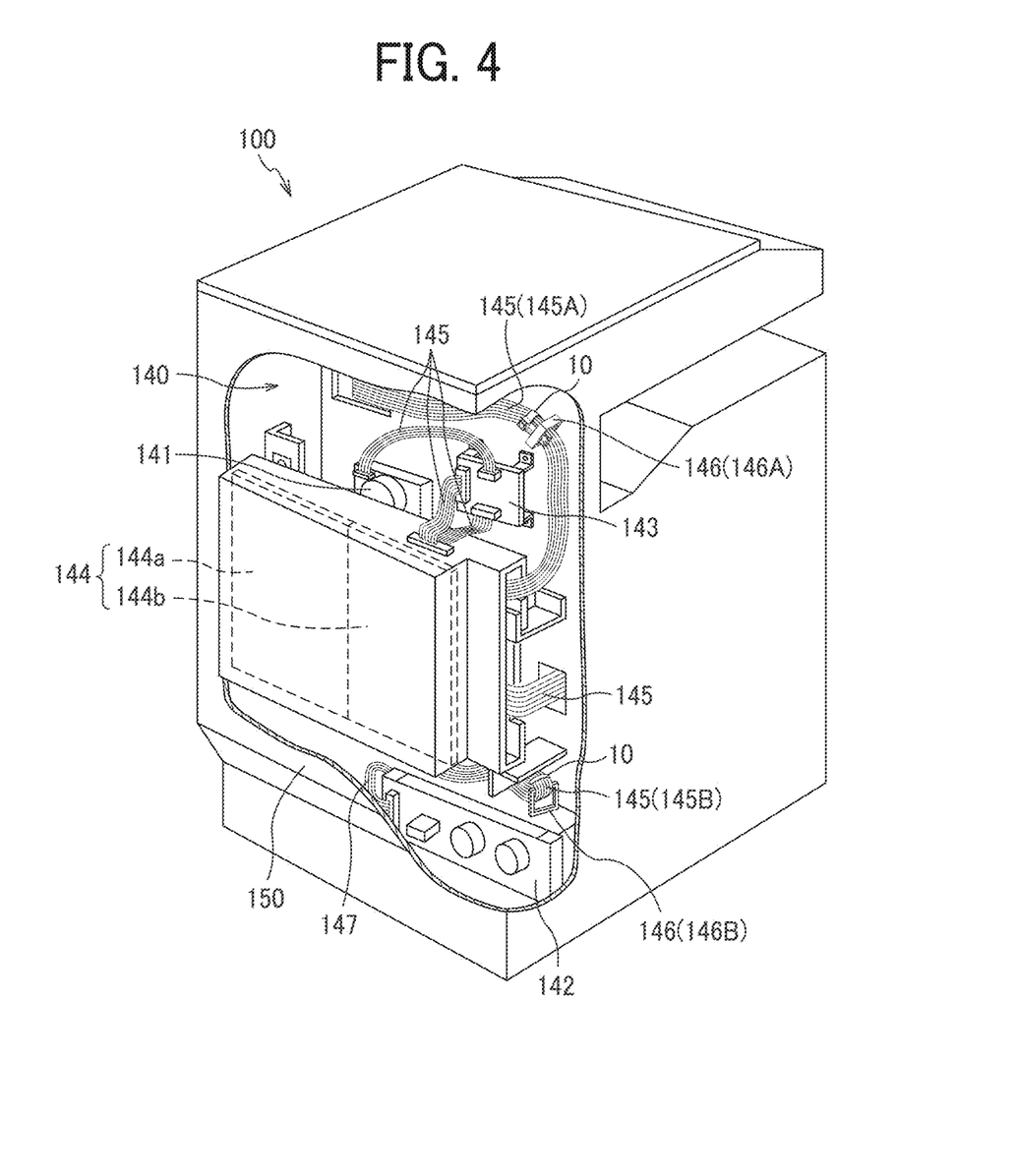
FIG. 4 is a perspective view of the image forming apparatus illustrated with a side face of a housing of the image forming apparatus partially cut away.

Before the binding band 10 is described in detail, a description is given of an example of the configuration of an image forming apparatus 100 in which the binding bands 10 are used. FIG. 3 is a schematic sectional view of the image forming apparatus 100. FIG. 4 is a perspective view of the image forming apparatus 100 illustrated with a side face of a housing 150 partially cut away.

The image forming apparatus 100 illustrated in FIG. 3 is an electrophotographic color printer that can also be used as a copier. The image forming apparatus 100 includes a scanner unit 110, a sheet feeding unit 120, an image forming unit 130, and an electrical component unit 140. The scanner unit 110 reads an image of a document placed on a document table 111 and generates image data. The sheet feeding unit 120 stores and stacks sheets P on which images are to be formed and separates and supplies the stored sheets P one by one. The image forming unit 130 forms an image on the sheet P supplied by the sheet feeding unit 120 based on image data. The electrical component unit 140 controls the scanner unit 110, the sheet feeding unit 120, and the image forming unit 130. The image forming apparatus 100 houses the scanner unit 110, the sheet feeding unit 120, the image forming unit 130, and the electrical component unit 140 in the housing 150.

The sheet feeding unit 120 is disposed, for example, at a lower portion of the housing 150 and includes a sheet tray 121 and a sheet supply mechanism 122. The sheet tray 121 stores the stacked sheets P and can separate and feed out the stored sheets P one by one. The sheet supply mechanism 122 guides the sheet P fed one by one from the sheet tray 121 to the image forming unit 130 located above the sheet tray 121.

The image forming unit 130 includes, for example, a photoconductor belt 131, a charger 132, an electrostatic latent image forming unit 133, developing units 134, an intermediate transfer belt 135, and a fixing unit 136. The photoconductor belt 131 bears an electrostatic latent image. The charger 132 uniformly charges a surface of the photoconductor belt 131. The electrostatic latent image forming unit 133 forms electrostatic latent images on the surface of the photoconductor belt 131 in accordance with the image data. The developing units 134 attach four color toners of black, cyan, magenta, and yellow onto the electrostatic latent images formed on the surface of the photoconductor belt 131 to form the toner images. The intermediate transfer belt 135 contacts the photoconductor belt 131 and the toner images formed on the surface of the photoconductor belt 131 are transferred onto the intermediate transfer belt 135. The fixing unit 136 transfers and fixes the toner images transferred on the intermediate transfer belt 135 onto the sheet P conveyed by the sheet supply mechanism 122.

In the image forming unit 130, the developing units 134 form toner images for respective colors on the photoconductor belt 131, and the intermediate transfer belt 135 superimposes the toner images for the colors formed on the photoconductor belt 131 sequentially. After the toner images for all colors have been transferred, the intermediate transfer belt 135 transfers the toner images onto the sheet P. As a result, a multi-color toner image (color image) is formed on the sheet P.

The electrical component unit 140 is disposed on a side of the image forming apparatus 100. As illustrated in FIG. 4, the electrical component unit 140 includes, for example, a drive unit 141, a power supply unit 142, an input/output (I/O) board 143, a main control unit 144a, and a control unit 144. The drive unit 141 drives the sheet feeding unit 120 and the image forming unit 130. The power supply unit 142 supplies power to the drive unit 141 and the like. The I/O board 143 performs input and output of image data. The main control unit 144a controls the scanner unit 110, the drive unit 141, and the like. The control unit 144 includes a sub control unit 144b to control writing and reading of image data.

In the electrical component unit 140, the wire bundle 145 in which a plurality of wires is bundled electrically connects, for example, the control unit 144 with the I/O board 143, the I/O board 143 with the drive unit 141, the control unit 144 with the scanner unit 110 (FIG. 3), the control unit 144 with the image forming unit 130 (FIG. 3), and the main control unit 144a of the control unit 144 with the sub control unit 144b. Thus, transmission and reception of various signals are performed. A set of wires 147 for supplying power connects the power supply unit 142 with the scanner unit 110, the sheet feeding unit 120, the image forming unit 130, and the electrical component unit 140.

Each wire bundle 145 is inserted through a ring-shaped harness clamp 146 (hereinafter referred to as clamp 146) provided at an appropriate position in the housing 150 to limit routing positions. As a result, interference by the wire bundle 145 to the components in the housing 150 is restrained. For example, a wire bundle 145A connects the control unit 144 with the scanner unit 110 and is inserted through a clamp 146A in a middle of the wire bundle 145A in a longitudinal direction of the wire bundle 145A. A wire bundle 145B connects the main control unit 144a of the control unit 144 with the sub control unit 144b and is inserted through a clamp 146B in a middle of the wire bundle 145B in a longitudinal direction of the wire bundle 145B.

As illustrated in FIG. 2, the inner diameter of the clamp 146 is matched with the thickness (diameter) of the wire bundle 145. When inserting each of the wire bundles 145 through each of the clamps 146, it is desirable to insert an appropriate position of the wire bundle 145 through the clamp 146 in order to restrain excessive tension or loosening of the wire bundle 145. Hence, the binding band 10 that binds the wire bundle 145 includes the index portion 14 to indicate a portion of the wire bundle 145 that is inserted through the clamp 146. Hereinafter, a description is given of details of the binding band 10 with which the index portion 14 is provided.

Binding Band 10 of First Embodiment

As illustrated in FIGS. 1A to 1C, the binding band 10 according to the first embodiment includes the band-shaped band portion 11, the locking portion 12, the connecting portion 13, and the index portion 14. The locking portion 12 is provided at one end in the longitudinal direction of the band portion 11. The connecting portion 13 protrudes from the locking portion 12 in the direction intersecting the longitudinal direction of the band portion 11. The index portion 14 is provided at a tip of the connecting portion 13. The binding band 10 is produced as a single component by, for example, molding a synthetic resin.

The band portion 11 includes a band-shaped base 11a and locking teeth 11b. The locking teeth 11b is formed on a back surface of the base 11a along a longitudinal direction of the base 11a. The base 11a has a flexibility to an extent that the base 11a can be bent into a loop shape, and the width and the length of the base 11a are appropriately determined according to the wire bundle 145 as a binding target. For example, in the first embodiment, the width of the base 11a is set to 5 mm and the length is set to 200 mm. A cross section of the locking teeth 11b is recessed and shaped like a saw edge. The locking teeth 11b is formed in a center of the base 11a in a width direction of the base 11a and along the longitudinal direction of the base 11a.

The locking portion 12 includes a rectangular tube-shaped locking portion body 12a and the tooth pawl 12c. The locking portion body 12a includes the through opening 12b through which the band portion 11 passes, inside the locking portion body 12a. The tooth pawl 12c protrudes from an inner wall surface of the locking portion body 12a toward the through opening 12b. The tooth pawl 12c includes a tongue piece protruding obliquely from the inner wall surface of the locking portion body 12a closer to the band portion 11 toward a front opening of the locking portion body 12a.

As illustrated in FIG. 1D, when the other end of the band portion 11 is inserted through a back opening 12d of the locking portion body 12a and pulled out to a front side, the locking teeth 11b are locked by the tooth pawl 12c. Thus, the band portion 11 is locked in a state in which the band portion 11 forms a loop. As illustrated in FIG. 2, the wire bundle 145 is bound by the loop formed by the band portion 11. Note that a surplus portion of the band portion 11, which is pulled out to the front side beyond the locking portion body 12a, is cut off at a position of a front side opening 12e.

As illustrated in FIGS. 1A to 1C, the connecting portion 13 is a strip-shaped plate protruding from a side of the locking portion 12 in the direction intersecting the longitudinal direction of the band portion 11. The connecting portion 13 defines a distance between the locking portion 12 and the index portion 14. The width and the length of the connecting portion 13 are appropriately determined according to the thickness of the wire bundle 145 as the binding target. For example, in the first embodiment, the width of the connecting portion 13 is set to 4 mm and the length is set to 20 mm. In this case, the locking portion 12 and the index portion 14 are arranged with a space of 20 mm set by the connecting portion 13.

The index portion 14 paired with the locking portion 12 indicates a portion of the wire bundle 145 that is inserted through the clamp 146. In the first embodiment, the index portion 14 has a rectangular parallelepiped block shape. The size of the index portion 14 is such that when the wire bundle 145 is inserted through the clamp 146, the index portion 14 contacts the clamp 146 and does not come out from the clamp 146. For example, the index portion 14 of the first embodiment has a length L14 of 6 mm, a width W14 of 2 mm, and a height H14 of 3 mm.

As illustrated in FIG. 2, when the band portion 11 is wrapped around an outer periphery of the wire bundle 145 and the locking portion 12 locks the band portion 11, the wire bundle 145 is bound by the binding band 10. When the wire bundle 145 is bound, the locking portion 12 and the index portion 14 are arranged with a space provided in the longitudinal direction of the wire bundle 145.

When the binding band 10 binds the wire bundle 145, a binding position of the binding band 10 is adjusted to allow the clamp 146 to be inserted at a position between the locking portion 12 and the index portion 14. In other words, the wire bundle 145 is bound by the binding band 10 at a position near the clamp 146 through which the wire bundle 145 is inserted. The wire bundle 145 is inserted through the clamp 146 using the locking portion 12 and the index portion 14 as a guide, thus allowing an appropriate position of the wire bundle 145 to be inserted through the clamp 146. As a result, excessive tension and loosening of the wire bundle 145 are restrained when the wire bundle 145 is routed.

Further, when the wire bundle 145 moves in the longitudinal direction, the locking portion 12 or the index portion 14 contacts the clamp 146. Thus, inconvenience of the wire bundle 145 moving too farther in the longitudinal direction can be restrained. In this respect also, excessive tension and loosening of the wire bundle 145 can be restrained.

As apparent from the above description, in the binding band 10 of the first embodiment of the present disclosure, the locking portion 12 and the index portion 14 can indicate a portion of the wire bundle 145 that is inserted through the clamp 146. Further, since the wire bundle 145 can be fastened by one band portion 11, the attachment of the band portion 11 to the wire bundle 145 can be easily performed.

Binding Band 20 of Second Embodiment

Figure 5A:
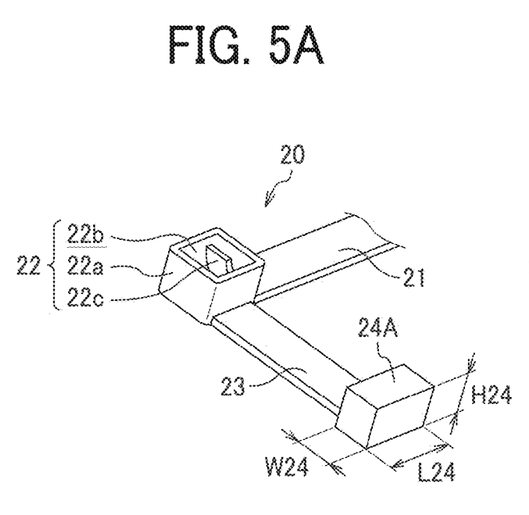
FIG. 5A is a perspective view of a tip of a binding band according to a second embodiment of the present disclosure.
Figure 5B:
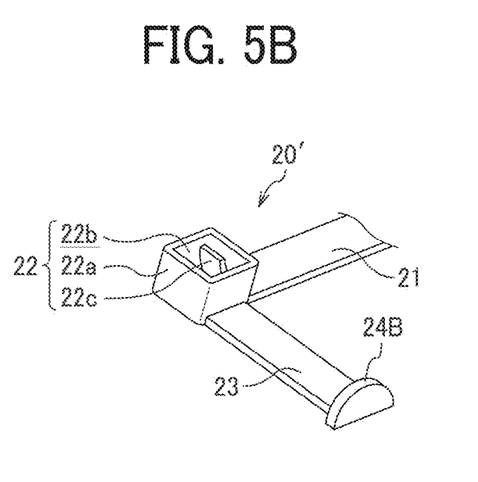
FIG. 5B is a perspective view of a tip of a binding band according to a variation of the second embodiment of the present disclosure.

FIG. 5A is a perspective view of a tip of a binding band 20 according to a second embodiment of the present disclosure. FIG. 5B is a perspective view of a tip of a binding band 20' according to a variation of the second embodiment of the present disclosure.

In the image forming apparatus 100, since electric wires forming the wire bundle 145 vary in thickness and number, the wire bundle 145 also varies in thickness. In the case of the clamps 146 also, a plurality of types of clamps 146 having different inner diameters is used depending on the thickness of the wire bundle 145 that is inserted through the clamp 146. Therefore, it is desirable that index portions 24A and 24B provided with the binding bands 20 and 20' have different shapes depending on the difference of the inner diameter of the clamp 146.

The binding band 20 according to the second embodiment illustrated in FIG. 5A differs from the binding band 10 according to the first embodiment in that the index portion 24A has a different size from the size of the index portion 14 of the binding band 10 depending on the difference of the inner diameter of the clamp 146. Note that, in the binding band 20 according to the second embodiment, the configuration other than the index portion 24A, that is, a band portion 21, a locking portion 22 (a locking portion body 22a, a through opening 22b, a tooth pawl 22c), and a connecting portion 23, is the same as the configuration of the first embodiment. Therefore, the description is omitted.

In the second embodiment, the index portion 24A has a rectangular parallelepiped block shape. The size of the index portion 24A (a length L24, a width W24, and a height H24) is different based on the difference of the inner diameter of the clamp 146 through which the wire bundle 145 is inserted. In other words, a plurality of types of binding bands 20 with the index portions 24A having different sizes is produced in advance. One type of binding band 20 is selected from among the plurality of types of binding bands 20 according to the inner diameter of the clamp 146 through which the wire bundle 145 is inserted to bind the wire bundle 145.

In the binding band 20 of the second embodiment having the above configuration, even if the inner diameter of the clamp 146 is different, the index portion 24A can be brought into contact with the clamp 146, thus allowing excessive movement of the wire bundle 145 in the longitudinal direction of the wire bundle 145 to be restrained.

Note that, in the binding band 20 illustrated in FIG. 5A, the index portion 24A has a rectangular parallelepiped shape, but the index portion 24A may have a shape other than a rectangular parallelepiped shape. For example, in the case of the binding band 20' according to a variation of the second embodiment illustrated in FIG. 5B, the index portion 24B may have a semicircular shape and a different size (for example, radius) depending on the size of the inner diameter of the clamp 146. Even with such a configuration, similar effects as in the case of the binding band 20 of the second embodiment can be obtained.

Binding Band 30 of Third Embodiment

In the image forming apparatus 100 described with reference to FIG. 4, the clamps 146 (146A and 146B) are provided at two locations in the housing 150, and the wire bundles 145 (145A and 145B) are inserted through the clamps 146 (146A and 145B), respectively. In the image forming apparatus 100 including the plurality of clamps 146, if the wire bundle 145 is inserted through a clamp 146 different from another clamp 146 through which the wire bundle 145 is to be inserted, the wire bundle 145 might be excessively stretched or loose. In order to reduce such inconvenience, it is desirable that the clamp 146 and a portion of the wire bundle 145 inserted through the clamp 146 are associated with each other.

Figure 6:
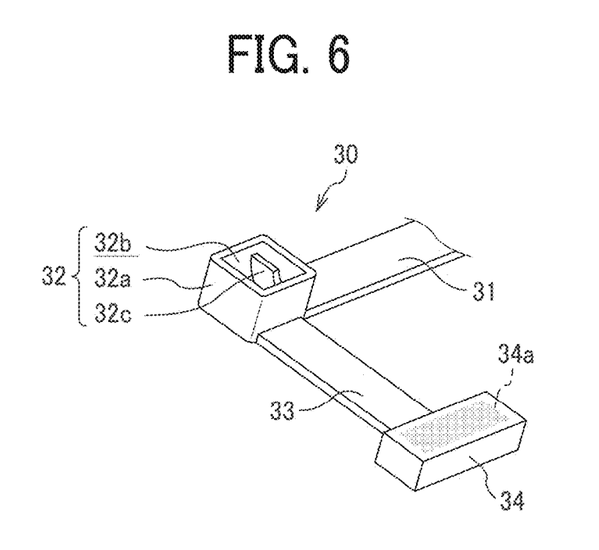
FIG. 6 is a perspective view of a tip of a binding band according to a third embodiment of the present disclosure.

FIG. 6 is a perspective view of a tip of a binding band 30 according to a third embodiment of the present disclosure. The binding band 30 according to the third embodiment includes an index portion 34 having an identification surface 34a. Note that, in the binding band 30 according to the third embodiment, the configuration other than the index portion 34, that is, a band portion 31, a locking portion 32 (a locking portion body 32a, a through opening 32b, a tooth pawl 32c), and a connecting portion 33, is the same as the configuration of the first embodiment. Therefore, the description is omitted.

In the binding band 30 according to the third embodiment, the index portion 34 has a rectangular parallelepiped shape and a surface of the index portion 34 is the identification surface 34a. The identification surface 34a includes a flat surface to which an identification symbol or a color can be applied. In an example illustrated in FIG. 6, the identification surface 34a is colored by a coloring material such as a pen or a paint. Alternatively, a sticker colored in a color for identification may be affixed onto the identification surface 34a, or a symbol (character, graphic) may be written with a pen on the identification surface 34a.

As described above, in the binding band 30 according to the third embodiment, the index portion 34 includes the identification surface 34a. Accordingly, when a plurality of locations of the wire bundle 145 is bound by a plurality of binding band 30, each of the binding locations can be distinguished by the color or the symbol attached to the identification surface 34a. Therefore, inconvenience of inserting a predetermined portion of the wire bundle 145 through another clamp 146 other than the predetermined clamp 146 can be effectively restrained.

Note that, in the third embodiment, a same symbol or a same color is attached to each of the identification surface 34a of the binding band 30 and the clamp 146. As a result, the binding band 30 and the clamp 146 are associated with each other by the symbol or the color. Thus, the above described inconvenience can be more effectively restrained.

Binding Band 40 of Fourth Embodiment

In the binding band 10 of the first embodiment illustrated in FIGS. 1A to 1D, the distance between the locking portion 12 and the index portion 14 is not indicated. In this case, for example, when there is a plurality of types of binding bands 10 with different distances between the locking portion 12 and the index portion 14 and the distance between the locking portion 12 and the index portion 14 in the binding band 10 is specified, a type of binding band 10 with a distance different from the specified distance might be undesirably used. In order to reduce such inconvenience, it is desirable that the distance between the locking portion 12 and the index portion 14 is indicated.

Figure 7A:
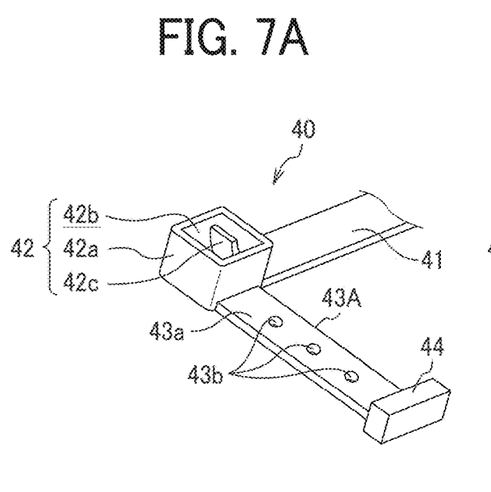
FIG. 7A is a perspective view of a tip of a binding band according to a fourth embodiment of the present disclosure.
Figure 7B:
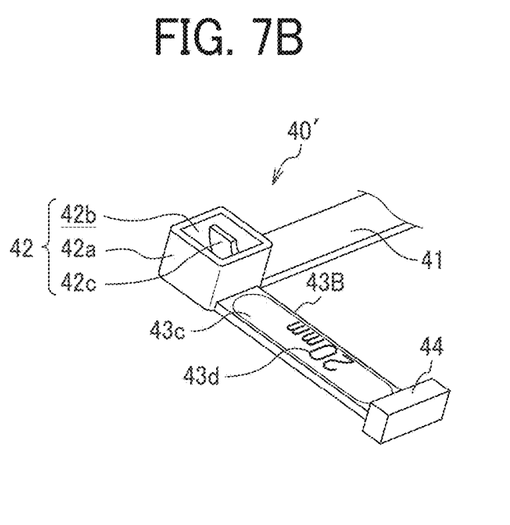
FIG. 7B is a perspective view of a tip of a binding band according to a variation of the fourth embodiment of the present disclosure.

FIG. 7A is a perspective view of a tip of a binding band 40 according to the fourth embodiment of the present disclosure. FIG. 7B is a perspective view of a tip of a binding band 40' according to a variation of the fourth embodiment of the present disclosure. Note that, in the binding bands 40 and 40' according to the fourth embodiment and the variation of the fourth embodiment, respectively, the configuration other than connecting portions 43A and 43B, that is, a band portion 41, a locking portion 42 (a locking portion body 42a, a through opening 42b, a tooth pawl 42c), and an index portion 44, is the same as the configuration of the first embodiment. Therefore, the description is omitted.

In the binding band 40 according to the fourth embodiment illustrated in FIG. 7A, a surface of the connecting portion 43A is a distance display surface 43a that indicates a distance between the locking portion 42 and the index portion 44. For example, three through holes 43b penetrating from the distance display surface 43a in a thickness direction of the connecting portion 43A are provided at intervals of 5 mm along a longitudinal direction of the connecting portion 43A. The through holes 43b are used as scales. Since the three through holes 43b are provided, the distance between the locking portion 42 and the index portion 44 can be recognized to be 20 mm.

Note that, in the binding band 40 illustrated in FIG. 7A, the through holes 43b are provided on the connecting portion 43A. However, in the binding band 40' illustrated in FIG. 7B, a numerical value 43d (20 mm) that indicates the distance between the locking portion 42 and the index portion 44 is displayed on a surface (distance display surface) 43c of the connecting portion 43B. The numerical value 43d may be printed, indicated by attaching a sticker, or molded with the connecting portion 43B.

As described above, in the binding band 40 according to the fourth embodiment and the binding band 40' according to the variation, the surfaces (distance display surface) 43a and 43c of the connecting portions 43A and 43B display the distance between the locking portion 42 and the index portion 44. Therefore, the distance between the locking portion 42 and the index portion 44 can be reliably recognized. Thus, for example, the inconvenience of using another type of binding band 40 or 40' different from a specified type of binding band can be effectively restrained.

Binding Band 50 of Fifth Embodiment

In the binding band 10 according to the first embodiment described with reference to FIGS. 1A to 1D, the index portion 14 has the rectangular parallelepiped block shape having substantially the same size as the locking portion 12. Therefore, if the index portion 14 is disposed on a back side of the wire bundle 145, it might be undesirably difficult to confirm whether the wire bundle 145 is inserted through the clamp 146 at a predetermined position. In order to reduce such inconvenience, it is desirable that the position of the index portion 14 can be recognized even if the index portion 14 is disposed on the back side of the wire bundle 145.

Figure 8A:
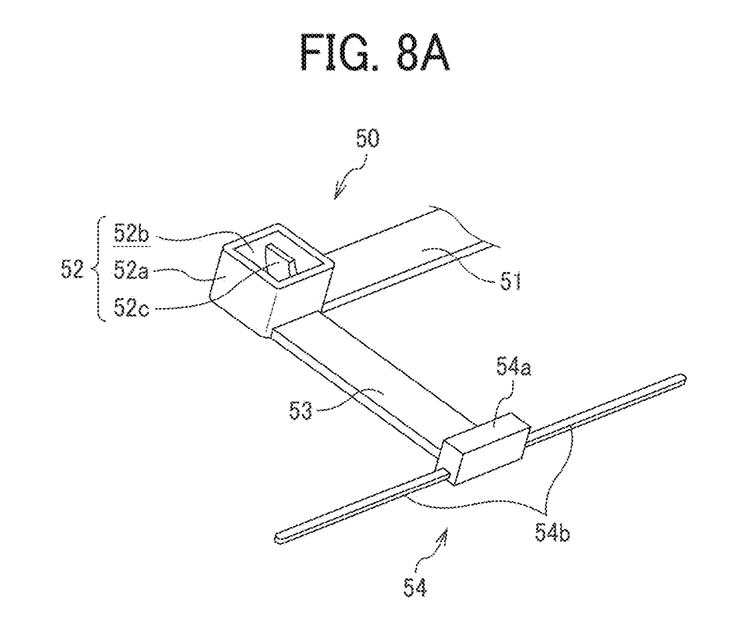
FIG. 8A is a perspective view of a tip of a binding band according to a fifth embodiment of the present disclosure.
Figure 8B:
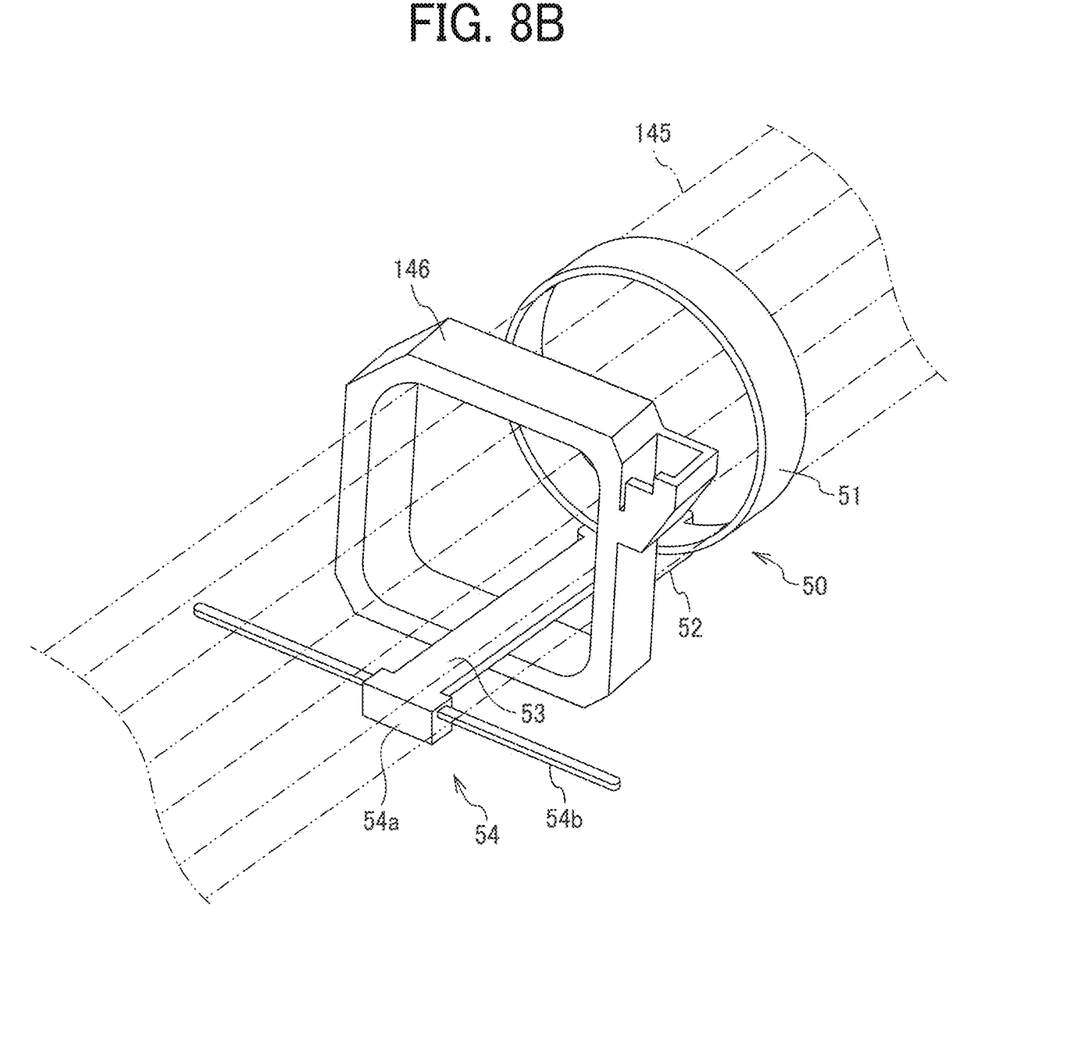
FIG. 8B is a perspective view of a wire bundle in a state in which the wire bundle is bound by the binding band according to the fifth embodiment of the present disclosure and inserted through a clamp.

FIG. 8A is a perspective view of a tip of a binding band 50 according to a fifth embodiment of the present disclosure. FIG. 8B is a perspective view of a wire bundle 145 bound by the binding band 50 according to the fifth embodiment of the present disclosure when the wire bundle 145 is inserted through the clamp 146. Note that, in the binding band 50 according to the fifth embodiment, the configuration other than an index portion 54, that is, a band portion 51, a locking portion 52 (a locking portion body 52a, a through opening 52b, a tooth pawl 52c), and a connecting portion 53, is the same as the configuration of the first embodiment. Therefore, the description is omitted.

In the binding band 50 according to the fifth embodiment illustrated in FIG. 8A, the index portion 54 includes an index portion body 54a and an auxiliary index portion 54b. The index portion body 54a has a rectangular parallelepiped shape. The auxiliary index portion 54b has a thin rod shape and extends in a longitudinal direction of the band portion 51. The auxiliary index portion 54b is made of, for example, a single bendable wire, and penetrates the index portion body 54a.

The length of the auxiliary index portion 54b is longer than the diameter of the wire bundle 145. Owing to this structure, as illustrated in FIG. 8B, even if the index portion 54 is disposed on the back side of the wire bundle 145, tips of the auxiliary index portion 54b are recognized beyond the wire bundle 145. Thus, the location of the index portion 54 can be recognized based on the position of the auxiliary index portion 54b.

As described above, in the binding band 50 according to the fifth embodiment, even if the index portion 54 is disposed on the back side of the wire bundle 145, the position of the index portion 54 can be recognized.

Binding Band 60 of Sixth Embodiment

As described in the case of the binding band 50 according to the fifth embodiment, even if the index portion 54 is disposed on the back side of the wire bundle 145, it is desirable that the position of the index portion 54 can be recognized.

Figure 9:
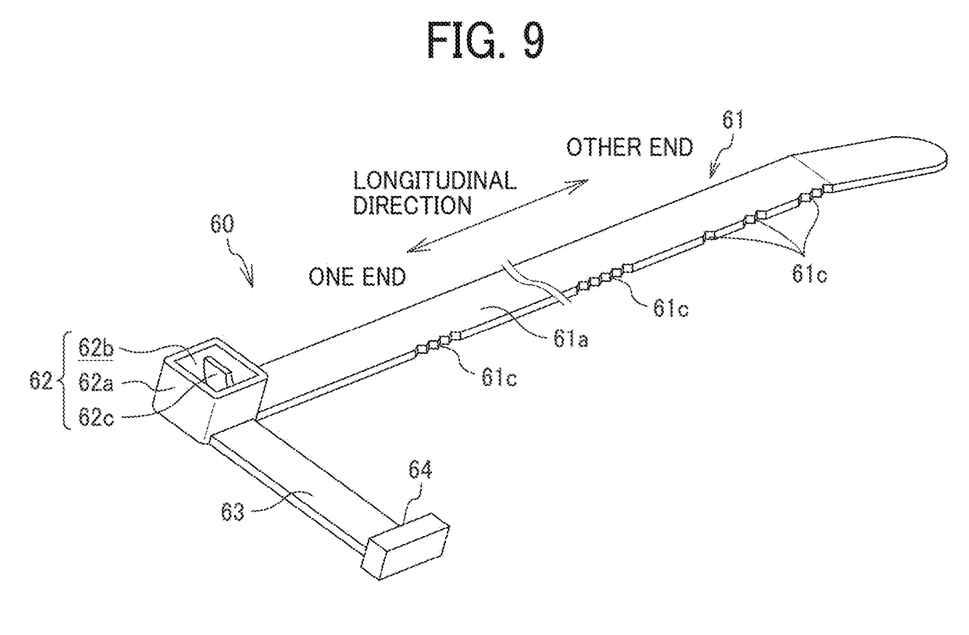
FIG. 9 is a perspective view of a binding band according to a sixth embodiment of the present disclosure.

FIG. 9 is a perspective view of a binding band 60 according to a sixth embodiment of the present disclosure. Note that, in the binding band 60 according to the sixth embodiment, the configuration other than a band portion 61, that is a locking portion 62 (a locking portion body 62a, a through opening 62b, a tooth pawl 62c), a connecting portion 63, and an index portion 64, is the same as the configuration of the first embodiment. Therefore, the description is omitted.

In the binding band 60 according to the sixth embodiment illustrated in FIG. 9, the shape of a lateral side of the band portion 61 (a base 61a) on the same side as the index portion 64 is different from the shape of another lateral side of the band portion 61 on the side opposite to the index portion 64. For example, saw-edged asperities 61c are provided at intervals in a longitudinal direction of the base 61a and on a lateral side of the base 61a on the same side as the index portion 64. Another lateral side of the base 61a on the side opposite to the index portion 64 includes a flat surface on which the asperities 61c are not provided. Locking teeth are provided on a back side of the base 61a.

Therefore, in the binding band 60 according to the sixth embodiment, the position at which the index portion 64 is disposed can be presumably recognized with relation to the asperities 61c provided on the base 61a. Since the clamp 146 is disposed near the asperities 61c of the base 61a, it can be determined that the wire bundle 145 is inserted through the clamp 146 at a predetermined position. As a result, even if the index portion 64 is disposed on the back side of the wire bundle 145, the position of the index portion 64 can be recognized based on whether the asperities 61c exist.

Note that, in the binding band 60 according to the sixth embodiment illustrated in FIG. 9, the asperities 61c may not be provided on the lateral side of the base 61a on the same side as the index portion 64 and may be provided on the other lateral side of the base 61a on the side opposite to the index portion 64. Alternatively, the asperities 61c may be provided across the entire of one lateral side of the base 61a.

Binding Band 70 According to Seventh Embodiment

As described in the case of the binding band 50 according to the fifth embodiment, even if the index portion 54 is disposed on the back side of the wire bundle 145, it is desirable that the position of the index portion 54 can be recognized.

Figure 10A:
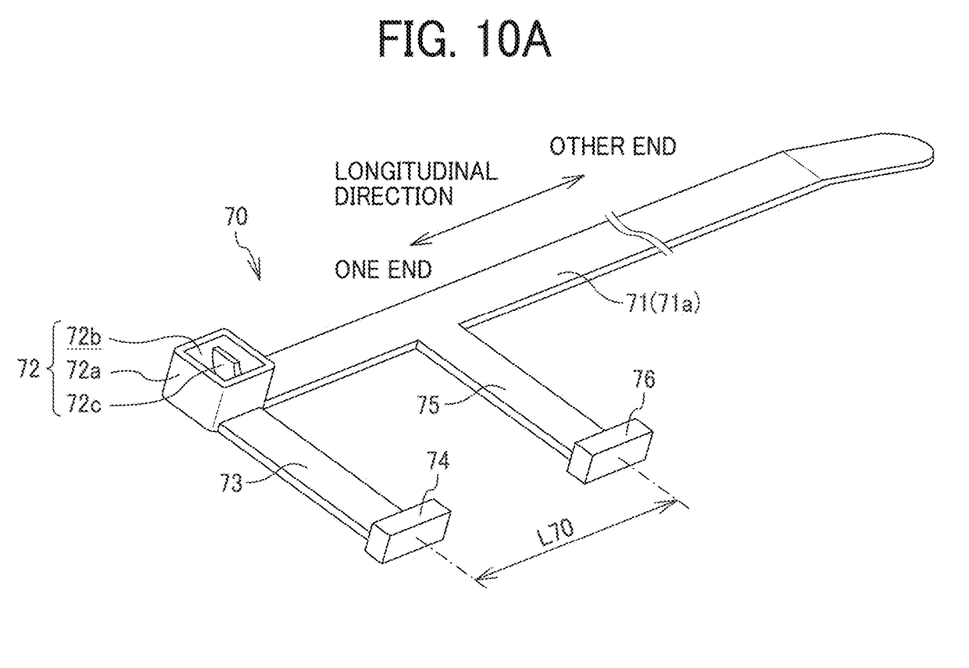
FIG. 10A is a perspective view of a binding band according to a seventh embodiment of the present disclosure.
Figure 10B:
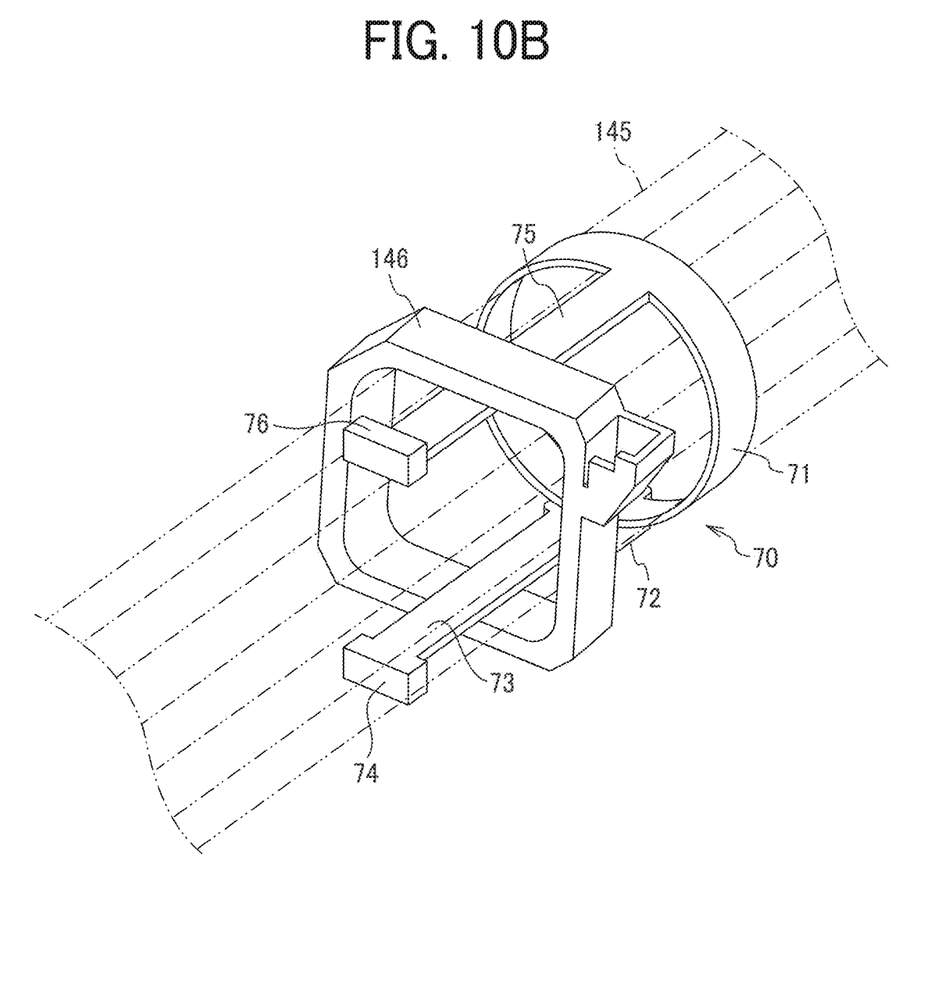
FIG. 10B is a perspective view of a wire bundle in a state in which the wire bundle is bound by the binding band according to the seventh embodiment of the present disclosure and inserted through a clamp.

FIG. 10A is a perspective view of a binding band 70 according to a seventh embodiment of the present disclosure. FIG. 10B is a perspective view of the wire bundle 145 bundled by the binding band 70 according to the seventh embodiment of the present disclosure when the wire bundle 145 is inserted through the clamp 146.

The binding band 70 according to the seventh embodiment includes an additional connecting portion 75 and an additional index portion 76. The connecting portion 75 protrudes from a band portion 71 (a band base 71*a*). The index portion 76 is provided on a tip (an appropriate position) of the connecting portion 75. Note that, in the binding band 70 according to the seventh embodiment, the configuration other than the connecting portion 75 and the index portion 76, that is, the band portion 71, a locking portion 72 (a locking portion body 72*a*, a through opening 72*b*, a tooth pawl 72*c*), a connecting portion 73, and an index portion 74, is the same as the configuration of the first embodiment. Therefore, the description is omitted.

In the binding band 70 according to the seventh embodiment illustrated in FIG. 10A, the additional connecting portion 75, same as the connecting portion 73, includes a strip-shaped small plate extending in a direction intersecting the longitudinal direction of the band portion 71. The additional index portion body 76 has a rectangular parallelepiped shape similarly with the index portion 74.

In the binding band 70, a distance L70 is a distance between the connecting portion 73 and the additional connecting portion 75 (a distance in the longitudinal direction of the band portion 71). It is desirable that a length of the distance L70 is set to a half of the peripheral length of the wire bundle 145 that is a binding target of the binding band 70. With this configuration, as illustrated in FIG. 10B, when two pairs (a pair of the connecting portion 73 and the index portion 74 and another pair of the connecting portion 75 and the index portion 76) are placed on the back side of the wire bundle 145, one of the two pairs is placed on the front side of the wire bundle 145. Thus, one of the two pairs can be visually recognized.

Note that the distance L70 that is a distance between the connecting portion 73 and the additional connecting portion 75 is not limited to the half of the peripheral length of the wire bundle 145. For example, the length of the distance L70 may be one-third or one-fourth of the peripheral length of the wire bundle 145. Even with this configuration, either one of the two pairs (the pair of the connecting portion 73 and the index portion 74 and the other pair of the connecting portion 75 and the index portion 76) can be visually recognized.

Variation

In the embodiments described above, the index portions 14, 24A (or 24B), 34, 44, 54, 64, and 74 are provided at the tips of the connecting portions 13, 23, 33, 43, 53, 63, and 73, respectively, but embodiments of the present disclosure are not limited to such a configuration. For example, the index portion 14 and the like may be provided midway in the longitudinal direction of the connecting portion 13 and the like. In other words, the index portion 14 and the like may be provided at an appropriate position on the connecting portion 13 and the like.

In each of the embodiments, the configuration of an embodiment and the configuration of another embodiment may be combined. For example, in the binding band 70 according to the seventh embodiment illustrated in FIG. 10A, a surface of the additional connecting portion 75 may be the distance display surface 43*a* or 43*c* described with the binding band 40 of the fourth embodiment.

In each of the above embodiments, the binding band 10 and the like that bind the wire bundle 145 provided in the image forming apparatus 100 are described. However, the binding bands according to the present disclosure can also be used to bind other wire bundles than the wire bundle 145 provided in the image forming apparatus 100.

Operations and Effects of Embodiments of Present Disclosure

Aspect 1

The binding band 10 according to Aspect 1 includes the band-shaped band portion 11, the through opening 12*b*, the locking portion 12, the connecting portion 13, and the index portion 14. The band portion 11 has the plurality of locking teeth 11*b* formed on a back surface (one surface) of the band portion 11. The band portion 11 is inserted through the through opening 12*b*. The through opening 12*b* is disposed at one end of the band portion 11 in a longitudinal direction of the band portion 11. The locking portion 12 includes the tooth pawl 12*c* to lock any one of the locking teeth 11*b* when the band portion 11 is inserted through the through opening 12*b*.

With the binding band 10 of the present embodiment of the present disclosure, the locking portion 12 and the index portion 14 can indicate a portion of the wire bundle 145 that is inserted through the clamp 146. Further, since the wire bundle 145 can be fastened by one band portion 11, the attachment of the band portion 11 to the wire bundle 145 can be easily performed.

Aspect 2

The binding band 20 according to Aspect 2 is positioned by being bound at a position near the ring-shaped clamp 146 through which the wire bundle 145 is inserted, and the shapes of the index portions 24A and 24B are different according to the difference of the inner diameter of the clamp 146.

In the binding band 20 of Aspect 2, even if the inner diameter of the clamp 146 is different, the index portions 24A and 24B can be brought into contact with the clamp 146, and excessive movement of the wire bundle 145 in the longitudinal direction of the wire bundle 145 can be restrained.

Aspect 3

In the binding band 30 according to Aspect 3, the index portion 34 includes the identification surface 34*a* to which an identification symbol or color can be applied.

In the binding band 30 according to Aspect 3, when a plurality of locations of the wire bundle 145 is bound by a plurality of binding bands 30, each of the binding locations can be distinguished by a color or a symbol attached on the identification surface 34*a*. Thus, inconvenience of inserting a predetermined position of the wire bundle 145 into another clamp 146 other than a predetermined clamp 146 can be restrained.

Aspect 4

In the binding band 40 according to Aspect 4, the connecting portions 43A and 43B include the distance display surfaces 43*a* and 43*b*, respectively, that indicate the distance between the locking portion 42 and the index portion 44.

In the binding band 40 according to Aspect 4, the distance display surfaces 43*a* and 43*b* display the distance between the locking portion 42 and the index portion 44. Therefore, the distance between the locking portion 42 and the index portion 44 can be reliably recognized.

Aspect 5

In the binding band 50 according to Aspect 5, the index portion 54 includes the auxiliary index portion 54*b* that has a thin rod shape and extends in the longitudinal direction of the band portion 51.

In the binding band 50 according to Aspect 5, even if the index portion 54 is disposed on the back side of the wire bundle 145, the position of the index portion 54 can be recognized with the auxiliary index portion 54*b*.

Aspect 6

In the binding band 60 according to Aspect 6, the shape of a lateral side of the band portion 61 on the same side as the index portion 64 is different from the shape of another lateral side of the band portion 61 on the side opposite to the index portion 64.

In the binding band 60 according to Aspect 6, even if the index portion 64 is disposed on the back side of the wire bundle 145, the position of the index portion 64 can be recognized based on the difference between the shapes of the lateral sides of the band portion 61.

Aspect 7

The binding band 70 according to Aspect 7 includes the additional connecting portion 75 and the additional index portion 76. The additional connecting portion 75 protrudes from the band portion 71 in a direction intersecting the band portion 71 and the additional index portion 76 is provided on an appropriate position of the additional connecting portion 75.

In the binding band 70 according to Aspect 7, when the two pairs (the pair of the connecting portion 73 and the index portion 74 and the other pair of the additional connecting portion 75 and the additional index portion 76) are placed on the back side of the wire bundle 145, one of the two pairs is placed on the front side of the wire bundle 145. Thus, one of the two pairs can be visually recognized.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A binding band comprising:
a band portion includes a plurality of locking teeth on one surface of the band portion and base portion, devoid of locking teeth, at a first terminal end of the band portion;
a locking portion, at a second terminal end of the band portion and directly attached to the second terminal end of the band portion, including a tooth pawl, configured to lock the locking teeth of the band portion upon the band portion being inserted through a through opening of the locking portion, the locking portion being on one end of the band portion in a longitudinal direction of the band portion; and
a connecting portion, having a clamp receiving surface, protruding from a side of the locking portion in a direction intersecting and perpendicular to the longitudinal direction of the band portion, the connecting portion including an index portion, wherein the index portion has a length in a direction parallel to the band portion that is less than a length of the band portion,
wherein the index portion includes an auxiliary index portion having a rod shape that passes through and extends from the index portion in the longitudinal direction of the band portion.

2. The binding band of claim 1,
wherein the index portion has a shape, dependent upon an inner diameter of a clamp.

3. The binding band of claim 1,
wherein the index portion includes an identification surface to which a symbol or a color for identification is applicable.

4. The binding band of claim 1,
wherein the connecting portion includes a distance display surface having markings indicating a distance between the locking portion and the index portion.

5. The binding band of claim 1,
wherein a shape of a lateral side of the band portion, on a same side as the index portion, is different from a shape of another lateral side of the band portion on a side opposite to the side of index portion.

6. The binding band of claim 1 further comprising:
an additional connecting portion parallel to the connecting portion and protruding from the band portion in the direction intersecting the longitudinal direction of the band portion, the additional connecting portion including an additional index portion.

7. The binding band of claim 1, wherein a width of the band portion is approximately 5 mm and a length of the band portion is approximately 200 mm.

8. The binding band of claim 1, wherein the locking portion includes a rectangular tube-shaped locking portion body.

9. The binding band of claim 1, wherein the tooth pawl includes a tongue piece protruding obliquely from an inner wall surface of the locking portion toward a front opening of the locking portion.

10. The binding band of claim 1, wherein the connecting portion is strip-shaped.

11. The binding band of claim 1, wherein the connecting portion defines a distance between the locking portion and the index portion.

12. The binding band of claim 2, wherein the index portion has a rectangular parallelepiped block shape.

13. The binding band of claim 1, wherein the tooth pawl of the locking portion protrudes from an inner wall surface of the locking portion, toward the through opening.

14. The binding band of claim 1, wherein the index portion extends perpendicular to the connecting portion.

15. The binding band of claim 2, wherein the index portion has a semicircular shape.

16. The binding band of claim 14, wherein the index portion has a rectangular parallelepiped block shape.

17. The binding band of claim 14, wherein the index portion has a semicircular shape.

* * * * *